(No Model.)

J. W. GUILLOTT.
FRICTION HEATER.

No. 540,833. Patented June 11, 1895.

Witnesses
Wm. F. Henning
Wm. N. Rheem

Inventor
James William Guillott
by Francis W. Parker, Atty (No Model.) 2 Sheets—Sheet 2.
J. W. GUILLOTT.
FRICTION HEATER.
No. 540,833. Patented June 11, 1895.
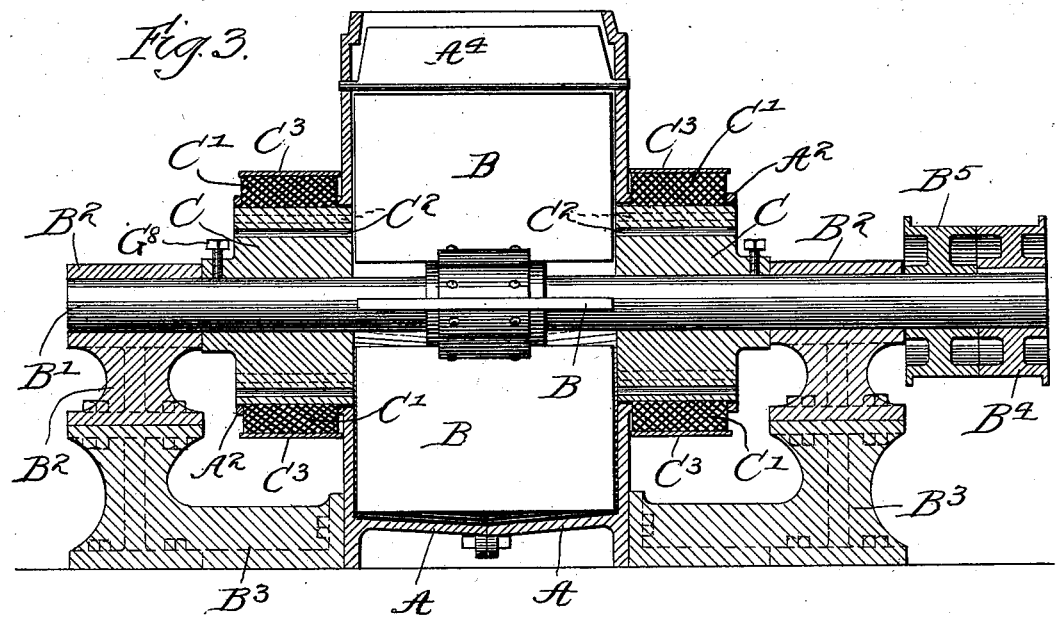
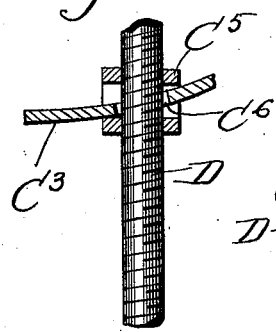
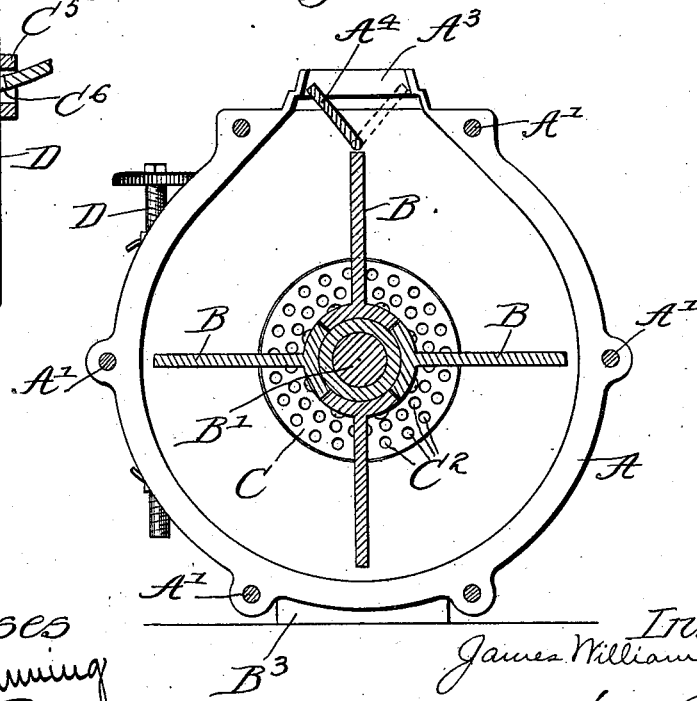
Witnesses
Inventor
James William Guillott
by Francis W. Parker, Atty.

UNITED STATES PATENT OFFICE.

JAMES WILLIAM GUILLOTT, OF CHICAGO, ILLINOIS, ASSIGNOR OF ONE-FOURTH TO WM. N. BROWN, OF MOUNT PLEASANT, MICHIGAN.

FRICTION-HEATER.

SPECIFICATION forming part of Letters Patent No. 540,833, dated June 11, 1895.

Application filed October 13, 1894. Serial No. 525,811. (No model.)

*To all whom it may concern:*

Be it known that I, JAMES WILLIAM GUILLOTT, a citizen of the United States, residing at Chicago, in the county of Cook and State of Illinois, have invented certain new and useful Improvements in Friction-Heaters, of which the following is a specification.

My invention relates to heating devices and has for its object to produce a new and improved frictional heater of which the following is a description, reference being had to the accompanying drawings, wherein—

Figure 1:
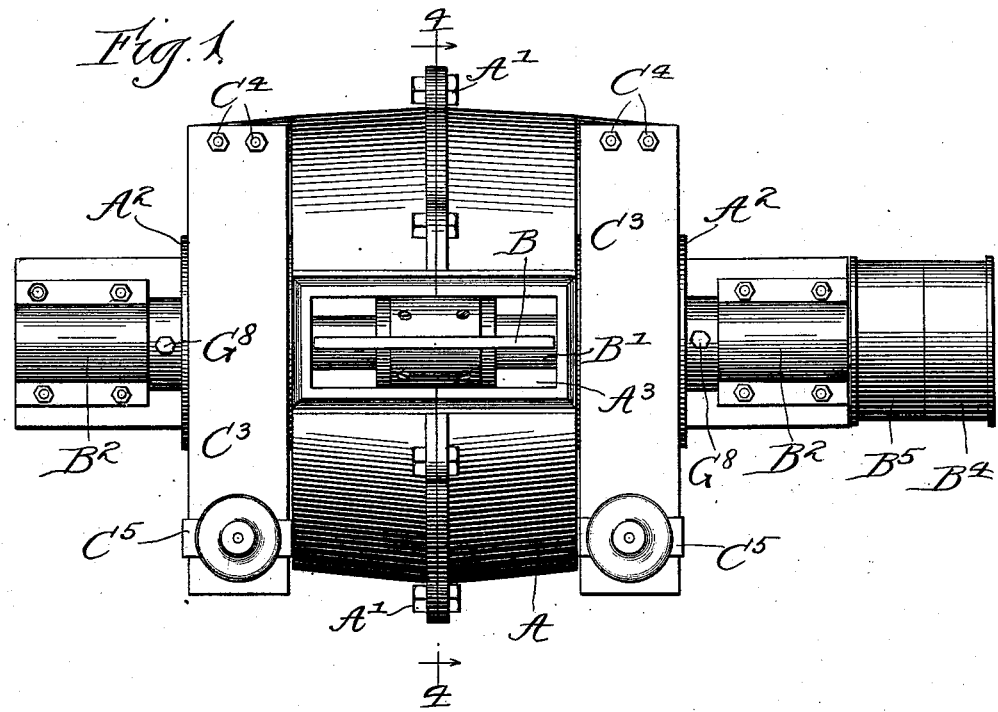
Figure 2:
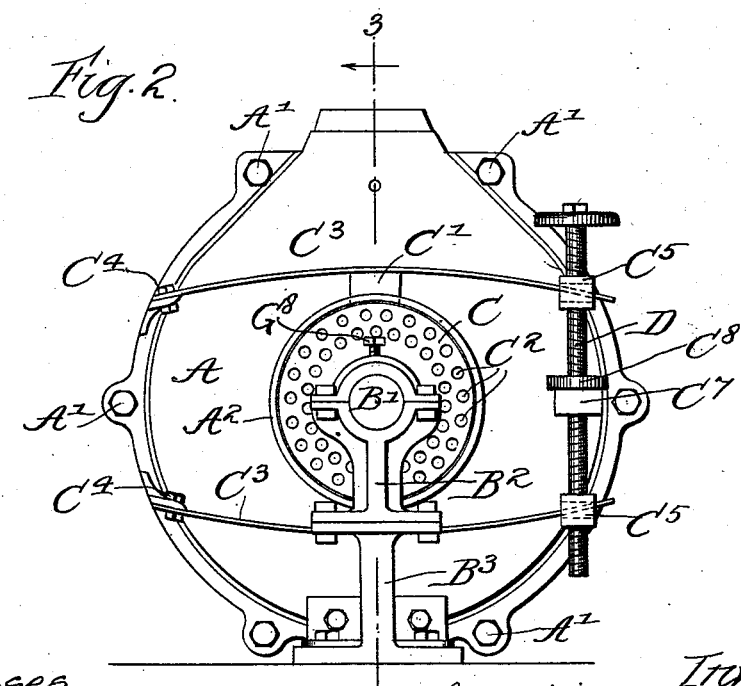

Figure 1 is a plan view of the heater. Fig. 2 is an end elevation of the same. Fig. 3 is a longitudinal section on line 3 3, Fig. 2. Fig. 4 is a cross-section on line 4 4, Fig. 1. Fig. 5 is a detail.

Like letters refer to like parts throughout the several figures.

A case A contains the fan wheel B which is keyed to the shaft $B'$. The case A is preferably divided the parts being connected by the bolts $A'$ $A'$. On each side of the case A, and preferably integral therewith, are the hollow projecting cylinders $A^2$ $A^2$. The shaft B is mounted in the bearings $B^2$ $B^2$ which are detachably attached to supporting pieces $B^3$ $B^3$. The fan wheel is made to revolve by means of the pulley $B^4$ which is keyed to the shaft $B'$. Said shaft is also provided with the idle pulley $B^5$. Removably attached to the shaft $B'$ are the friction pulleys C C adapted to fit loosely into the hollow cylinders $A^2$ $A^2$. Said hollow cylinders are each provided with slots or openings on their peripheries into which fit the friction blocks $C'$ $C'$. Said friction blocks $C'$ $C'$ fit loosely in the slots in the cylinders $A^2$ $A^2$ so that they come in contact with the peripheries of the friction wheels C C. Said friction wheels are preferably made solid as shown and are provided with the holes or perforations $C^2$ $C^2$. The friction blocks $C'$ $C'$ are held in place by means of the springs $C^3$ $C^3$ which are rigidly connected at one end to the case A by means of the bolts $C^4$ $C^4$. The other ends of said springs pass through slots in the blocks $C^5$ $C^5$. The screw rods D D pass through the blocks $C^5$ $C^5$ which are provided with screw threads to engage the screw threads on the rods. Said rods are provided with right and left hand threads as shown, so that the blocks $C^5$ $C^5$ will move in opposite directions along said screw rod when it is revolved in either direction. The ends of the springs $C^3$ $C^3$ are provided with the slots $C^6$ $C^6$ (see Fig. 5) through which loosely pass the screw rods D D. Said screw rods also pass loosely through the projecting lugs $C^7$ $C^7$ on the case A, and are provided with collars $C^8$ $C^8$ adapted to engage said projecting lugs and hold the screw rods in position.

The case A is preferably of the shape shown in Fig. 2, the opening $A^3$ being near the center of the case so that the air will be forced out of said opening regardless of the direction in which the fan wheel revolves.

The friction wheels C C are preferably made of cast iron and are made to revolve with the shaft $B'$ by means of the set screws $G^8$ $G^8$.

The opening $A^3$ is provided with a movable damper $A^4$ by which the air is prevented from circulating about the cylinder, the damper or valve inclining in either direction according to the direction of revolution of the fan.

It is evident that these several parts may be varied in form, construction and arrangement without departing from the spirit of my invention, and I therefore do not wish to be limited to the exact construction shown.

The use and operation of my invention are as follows: When it is desired to start the heater the shaft $B'$ is revolved by means of the pulley $B^4$ or in any other convenient manner. The friction wheels C C being connected with said shaft, are also revolved. The stationary friction blocks $C'$ $C'$ which are in contact with the friction wheels C C, are made to bear against the friction wheels by means of the springs $C^3$ $C^3$ and the friction produced causes the friction wheels to become heated. The revolution of the fan wheel B draws the air through the holes $C^2$ $C^2$ in the friction wheels C C and forces it out through the opening $A^4$ in the case A. The heated condition of the friction wheels C C causes the air passing through them to become heated, and said heated air is forced through the opening $A^4$. This heated air may be conveyed directly to the apartment to be heated, or may be conveyed to several apartments by means of pipes or tubes in the ordinary manner. The constant current of air through the holes in the friction wheels C C prevents said friction wheels from becoming excessively heated.

When the heater is placed in the apartment to be heated it not only forces heated air into such apartment, but it draws in the colder air near the floor and gives it out again in a heated condition. The friction wheels C C may be easily and cheaply replaced when desired.

This heater may be used for heating apartments of all sorts, and is especially adapted for the heating of railway cars and street cars, as it may be connected to the axle of such cars and will thus furnish heat for the cars and do away with the use of stoves or other expensive heating devices. When used in this connection it has great advantages, as the power required to run it is very small and would be practically unnoticeable. At the same time it does away with the trouble and cost of other heating devices, and also with the danger connected with ordinary heating devices when used on railway cars and the like.

The pressure between the friction blocks C' C' and the friction wheels C C may be regulated by means of the screw rods D D.

The fan may be shaped otherwise than as here shown and may have a greater or less number of blades, and these blades may be curved or straight as occasion may require. The friction blocks I find are preferably made of carbon, as by the use of proper carbon a proper relation between the friction block and friction wheel may be obtained so that the heating effect is produced while the wheel is not excessively worn.

I claim—

1. In a frictional heater the combination of an air heater with a carbon shoe, a driving device to keep one part in relative motion to the other while they are in contact and an air moving device to pass a current of air over the hot surfaces and discharge it into the room to be heated.

2. In a frictional heater the combination of an air heater comprising metal pierced by a series of perforations, with a carbon shoe a driving device to keep one part in motion relative to the other while making contact therewith and an air moving device to pass a current of air through the perforations and thence into the compartment to be heated.

3. The combination, in a frictional heater, of a friction wheel having openings therethrough, a carbon shoe for the periphery of such wheel adapted to make frictional contact with the opposed surface, a driving device to keep one part in motion relative to the other and an air moving device associated with said friction wheel in such a manner that air may be drawn or forced through said friction wheel when the heater is in operation, and delivered at a higher temperature to the room to be heated.

4. The combination in a frictional heater of a case containing a fan wheel, a friction wheel associated with said case and forming the side thereof and provided with openings in communication with the inside of said case and the outside atmosphere, and an opposed frictional carbon shoe adapted to bear on the periphery of the friction wheel and a device to keep one part in motion relative to the other whereby air may be drawn through the openings in the heated friction wheel and delivered at a higher temperature into the apartment to be heated.

5. The combination in a frictional heater of a case containing a fan wheel and provided at each end with a hollow projecting cylinder, a perforated friction wheel adapted to rotate within each of said cylinders, one or more carbon friction blocks adapted to fit loosely in slots in said cylinders and bearing against the peripheries of said friction wheels, and a regulable spring adapted to bear on each of said friction blocks and force them against the friction wheels.

6. In a frictional heater the combination of an air heater comprising a metal wheel pierced by a series of perforations, with a shoe making frictional contact with the periphery of the heater to heat the same a device to keep one of the parts in motion relative to the other and an air moving device to pass a current of air through the perforations and thence into the compartment to be heated.

7. In a friction heater the combination of two friction wheels having openings therethrough parallel with the axis, with friction block bearing against the periphery of the wheels and an air driving or moving device between the wheels which causes the air to pass through the apertures in the wheel and thence delivers it to the parts where the heat is to be applied.

8. The combination in a frictional heater of a case containing a fan wheel, one or more friction wheels associated with said case and on the same shaft with the fan wheel and provided with openings which connect the inside of the case with the outside atmosphere, and opposed frictional surfaces or shoes adapted to bear on the peripheries of the friction wheel or wheels.

JAMES WILLIAM GUILLOTT.

Witnesses:
D. M. CARTER,
JNO. H. COULTER.